UNITED STATES PATENT OFFICE.

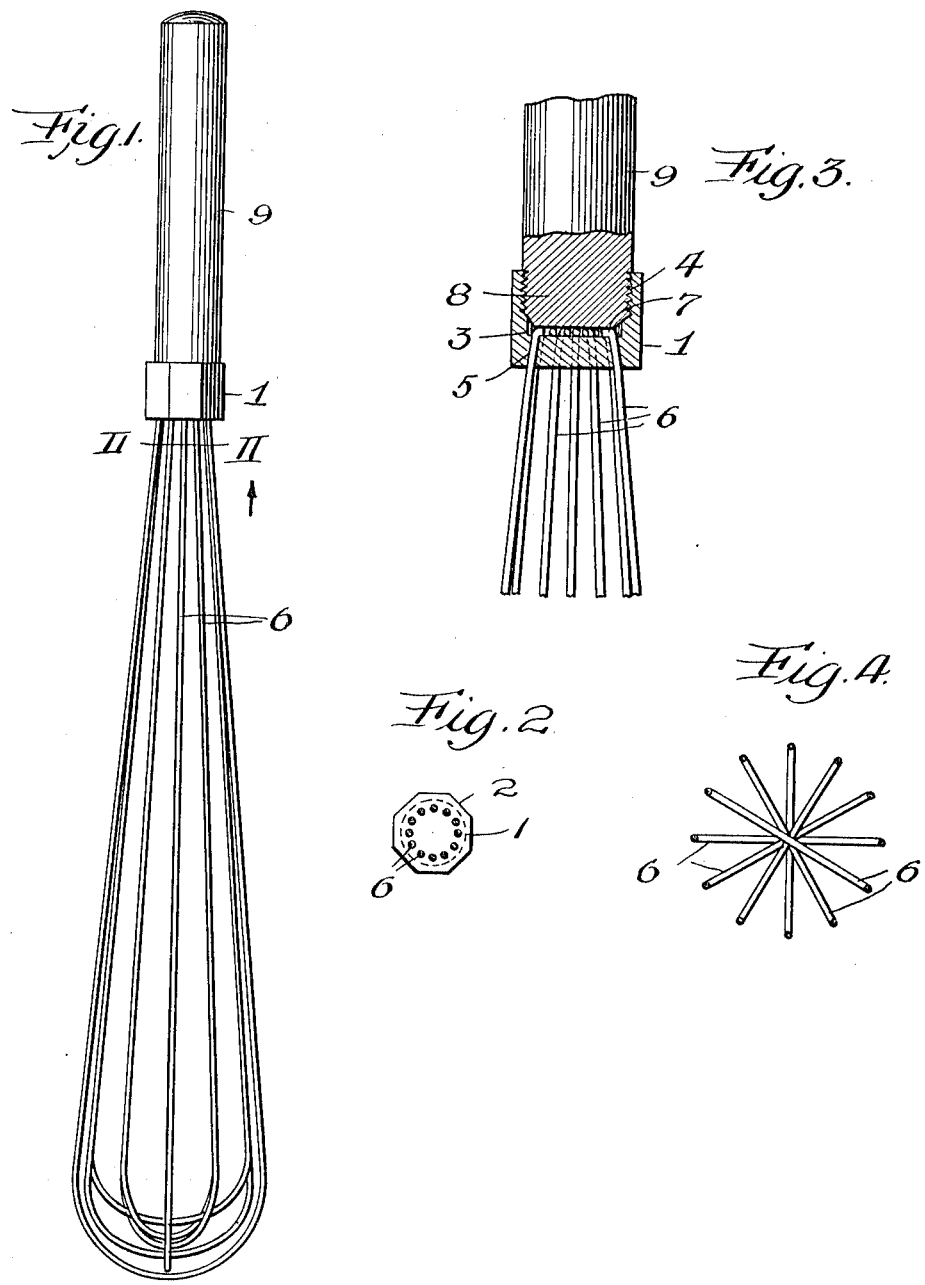

WILLIAM J. PARHAM, OF PITTSBURGH, PENNSYLVANIA.

EGG-BEATER.

1,072,251. Specification of Letters Patent. Patented Sept. 2, 1913.

Application filed May 4, 1912. Serial No. 695,149.

*To all whom it may concern:*

Be it known that I, WILLIAM J. PARHAM, a citizen of the United States of America, residing at Pittsburgh, in the county of Allegheny and State of Pennsylvania, have invented certain new and useful Improvements in Egg-Beaters, of which the following is a specification, reference being had therein to the accompanying drawing.

This invention relates to an egg beater, and the primary object of my invention is to provide a culinary implement that can be used for expeditionally beating, whipping and mixing various foods, for instance eggs.

Another object of this invention is to provide an implement of the above type consisting of comparatively few parts, inexpensive to manufacture, easy to assemble, durable, and highly efficient for the purposes for which they are intended.

I attain the above objects by a mechanical construction that will be hereinafter specifically described and then claimed, and reference will now be had to the drawing, wherein:—

Figure 1 is a side elevation of the egg beater. Fig. 2 is a horizontal sectional view of the same taken on the line 11—11 of Fig. 1. Fig. 3 is an enlarged sectional view of a portion of the egg beater, and Fig. 4 is a horizontal sectional view of part of the egg beater.

An egg beater in accordance with this invention comprises a cap 1 that is hexagonal, octagonal, square or any desired shape in plan whereby flat faces 2 will be provided that facilitate adjusting said cap. The cap 1 has a socket 3 and the walls of said socket are screw threaded, as at 4. The bottom of the cap is of greater thickness than the side and is formed with a circular row of downwardly and outwardly inclined openings 5 which communicate with the socket 3. The reference character 6 denotes elongated radially disposed loop-shaped members each formed from a single piece of wire and of tapering contour, the arms of said members have portions thereof of greater inclination than the remaining portion and the said portions of greater inclination of said arm extending through the openings 5 and are of the same length as the length of said opening. The arms of said members have their free ends bent at right angles and clenched, as at 7 whereby the ends of said members can be held within said cap by the reduced exteriorly screw threaded end 8 of a handle 9 that is screwed into said cap. The end of the handle 9 engages the bent ends of the members 6 and locks the ends of said members relatively to the cap. It is possible by this means of holding the ends of the members to shift the members in the openings 5, after the handle 9 has been removed, straighten the bent ends of said members and then remove the members entirely relatively to the cap 1. This manner of holding the members permits of a member being renewed when broken or injured without discarding the remainder of the egg beater.

The tapering wire members 6 have the large ends thereof intersecting in order that said members can be radially disposed relatively to the longitudinal axis of the implement. The large loop shaped ends of said members constitute the beating or whipping end of the implement and this end of the implement is yieldably supported relatively to the handle 9 by reason of the length of said members, consequently eggs or other foods can be forcibly agitated without danger or liability of the receptacle in which they are placed being injured.

It is thought that the operation and utility of the implement will be apparent without further description, and while in the drawing there is illustrated a preferred embodiment of the invention, it is to be understood that the structural elements are susceptible to such changes as fall within the scope of the appended claim.

What I claim is:—

An egg whipper comprising an inverted cap having its outer face formed with plane surfaces having its inner face provided with threads, the bottom of said cap being of greater thickness than the side and formed with a circular row of downwardly and outwardly inclined openings, elongated radially disposed loop-shaped members each formed from a single piece of wire and of tapering contour, the arms of said members having portions thereof of greater inclination than the remaining portion and said portion of greater inclinations extending through and of the same length as the length of said openings, the arms of said members having their free ends bent at right angles to engage the upper face of the bottom of said cap, and a threaded handle extending in and engaging the threads of said socket and further engaging the bent ends of said members for maintaining these latter from longitudinal movement with respect to said cap.

In testimony whereof I affix my signature in the presence of two witnesses

WILLIAM J. PARHAM.

Witnesses:
 MAX H. SROLOVITZ,
 K. H. BUTLER.